(12) United States Patent
Wang

(10) Patent No.: US 9,744,605 B2
(45) Date of Patent: Aug. 29, 2017

(54) SAW BLADE CLAMPING DEVICE

(71) Applicants: Bosch Power Tools (China) Co., Ltd., Hangzhou, Zhejiang (CN); Robert Bosch GmbH, Stuttgart (DE)

(72) Inventor: Yanchao Wang, Zhejiang (CN)

(73) Assignees: Bosch Power Tools (China) Co., Ltd., Hangzhou, Zhejiang (CN); Robert Bosch GmbH, Stuttgart (DE)

( * ) Notice: Subject to any disclaimer, the term of this patent is extended or adjusted under 35 U.S.C. 154(b) by 323 days.

(21) Appl. No.: 14/372,592

(22) PCT Filed: Jan. 15, 2013

(86) PCT No.: PCT/CN2013/070454
§ 371 (c)(1),
(2) Date: Jul. 16, 2014

(87) PCT Pub. No.: WO2013/107331
PCT Pub. Date: Jul. 25, 2013

(65) Prior Publication Data
US 2014/0360335 A1  Dec. 11, 2014

(30) Foreign Application Priority Data
Jan. 16, 2012 (CN) .......................... 2012 1 0012290

(51) Int. Cl.
*B23D 51/10* (2006.01)
*B23D 49/16* (2006.01)
(52) U.S. Cl.
CPC ............. *B23D 51/10* (2013.01); *B23D 49/16* (2013.01); *Y10T 83/9481* (2015.04)
(58) Field of Classification Search
CPC ............................... B23D 51/10; B27B 19/002
(Continued)

(56) References Cited

U.S. PATENT DOCUMENTS 3,583,716 A * 6/1971 Daniel, Jr. .......... B23B 31/1071
279/81
3,750,283 A * 8/1973 Hoffman .............. B23D 49/167
30/338

(Continued)

FOREIGN PATENT DOCUMENTS

CN 200995304 Y 12/2007
CN 101612681 A 12/2009
(Continued)

OTHER PUBLICATIONS

International Search Report corresponding to PCT Application No. PCT/CN2013/070454, mailed Apr. 25, 2013 (4 pages).

*Primary Examiner* — Kenneth E Peterson
(74) *Attorney, Agent, or Firm* — Maginot, Moore & Beck LLP

(57) ABSTRACT

A saw blade clamping device is configured to clamp at least two types of saw blades and includes a clamping seat and an operating member. The clamping seat has a connecting portion and a loading portion with a loading slot. The operating member has an operating portion with assembling and loading ends. The operating portion is assembled around the loading portion with the assembling end, and the loading end has a loading port. The operating member is rotatable relative to the loading portion. An inner wall of the operating member has a curved driving surface. An abutting element, disposed between the operating member and the clamping seat, has an abutting end, which can extend into the loading slot, and a driving end, which abuts against the driving surface. The abutting end is driven by the driving surface during rotation of the operating member to move into the loading slot.

16 Claims, 11 Drawing Sheets

(58) Field of Classification Search
USPC .......................................... 83/699.21; 30/392
See application file for complete search history.

(56) References Cited

U.S. PATENT DOCUMENTS

| | | | | |
|---|---|---|---|---|
| 5,421,232 | A * | 6/1995 | Laverick ................ | B23D 51/10 30/394 |
| 6,276,065 | B1 * | 8/2001 | Osada .................... | B23D 51/10 279/904 |
| 6,612,039 | B2 * | 9/2003 | Kakiuchi ............... | B23D 51/10 279/75 |
| 6,725,548 | B1 * | 4/2004 | Kramer ................. | B23D 51/10 279/75 |
| 7,441,338 | B2 | 10/2008 | Delfini et al. | |
| 8,465,492 | B2 * | 6/2013 | Estes .................. | A61B 17/1615 279/71 |
| 2002/0124419 | A1 * | 9/2002 | Hirabayashi ........... | B23D 51/10 30/329 |
| 2005/0257382 | A1 * | 11/2005 | Lui ....................... | B23D 49/16 30/392 |
| 2009/0273146 | A1 | 11/2009 | Dezheng et al. | |
| 2010/0000100 | A1 * | 1/2010 | Saegesser .............. | B23D 51/10 30/392 |

FOREIGN PATENT DOCUMENTS

| | | |
|---|---|---|
| CN | 101678483 A | 3/2010 |
| DE | 202 06 217 U1 | 9/2002 |
| EP | 1 422 009 A2 | 5/2004 |
| EP | 1 555 078 A1 | 7/2005 |
| GB | 2463539 A | 3/2010 |

* cited by examiner

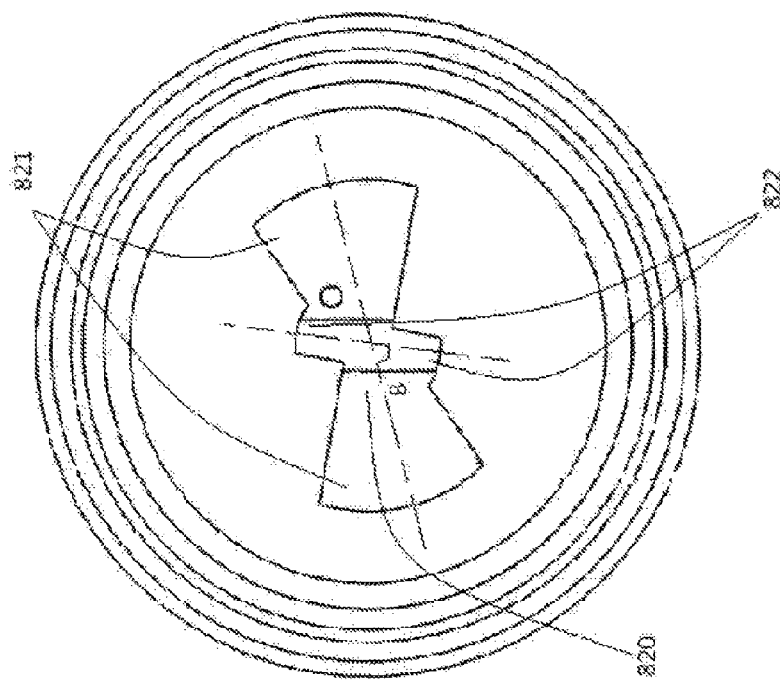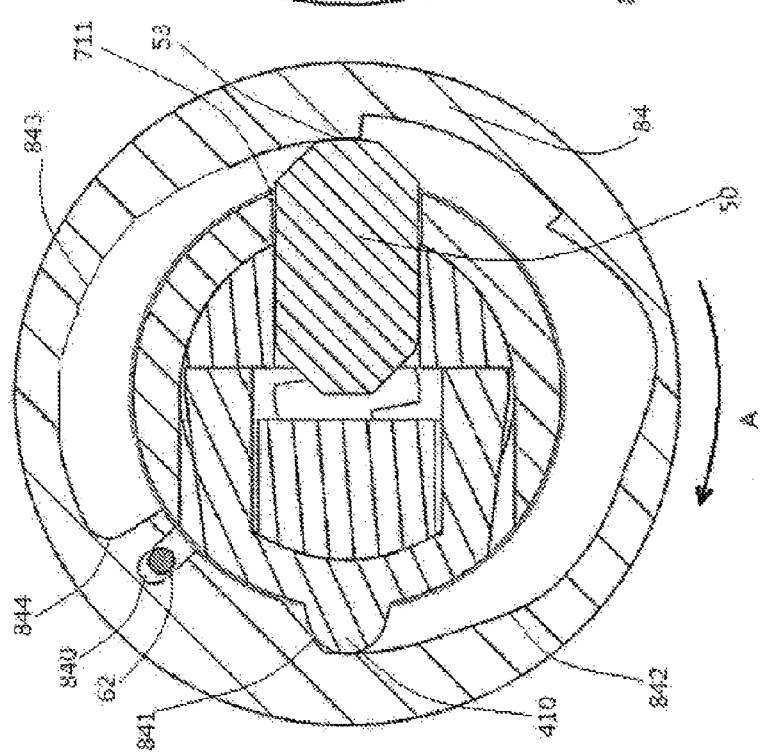
Figure 4A
Figure 4B

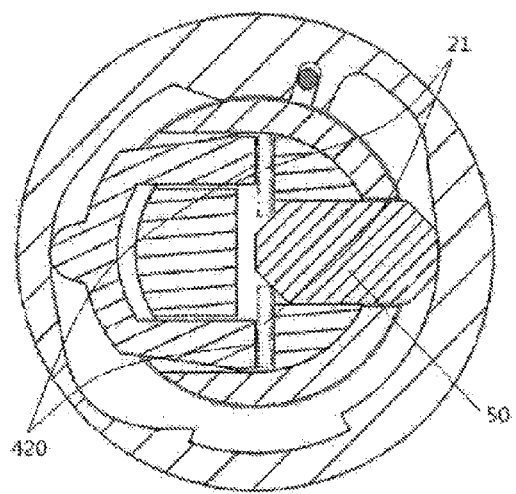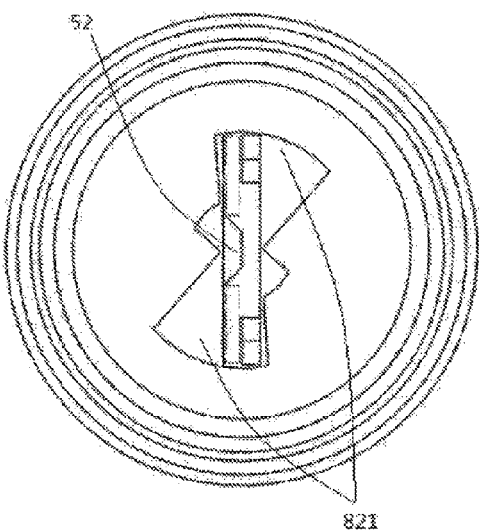
Figure 6A  Figure 6C
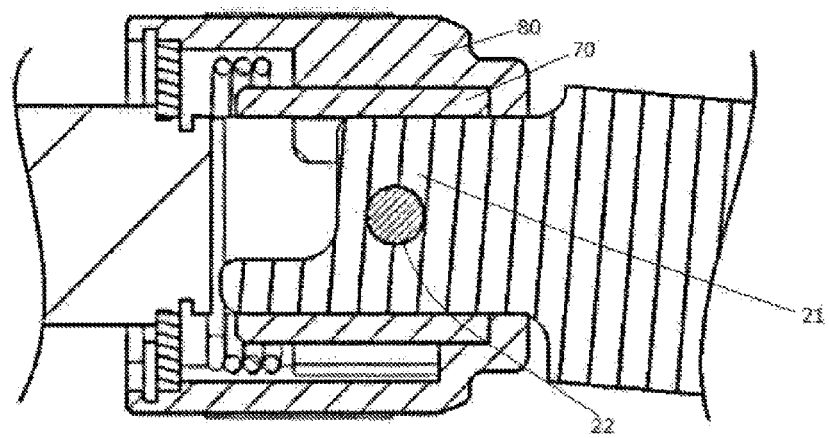
Figure 6B

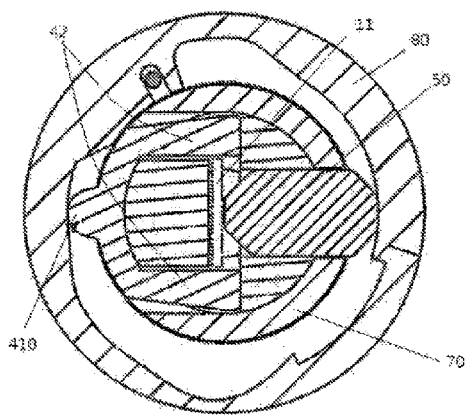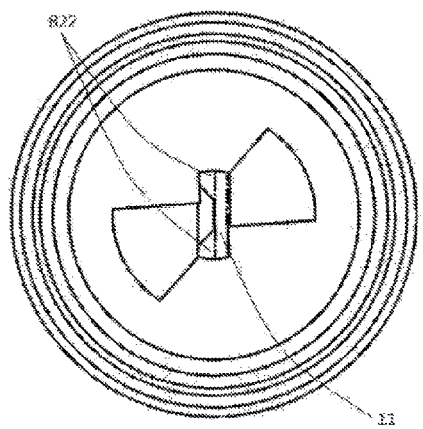
Figure 8A     Figure 8C
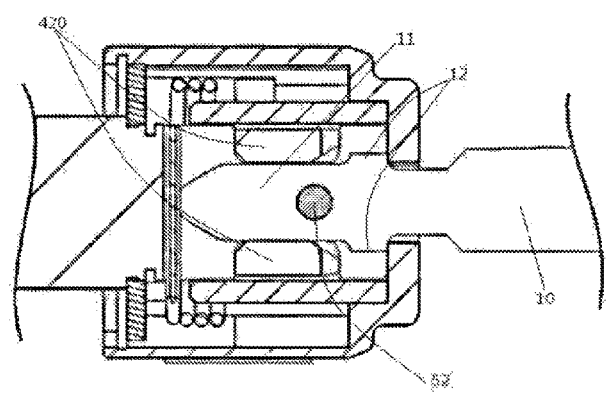
Figure 8B

SAW BLADE CLAMPING DEVICE

TECHNICAL FIELD

This application is a 35 U.S.C. §371 National Stage Application of PCT/CN2013/070454, filed on Jan. 15, 2013, which claims the benefit of priority to Serial No. CN201210012290.2, filed on Jan. 16, 2012 in China, the disclosures of which are incorporated herein by reference in their entirety.

BACKGROUND ART

FIGS. 1A, 1B, and 1C show a saw blade clamping device 100' used in a hand-held linearly reciprocating type sawing machine according to prior art. The saw blade clamping device is able to clamp either of a jigsaw blade 10 and a reciprocating saw blade 20 which have different shanks as shown in FIGS. 2A and 2B, respectively. The saw blade clamping device 100' comprises a first clamping plate 30', a second clamping plate 40', a first driving element 50', a second driving element 60', and a fixing pin 31' assembled to the first clamping plate 30', wherein the second clamping plate 40' is provided with a slot 41' (shown in FIG. 1B) having a shape matching with that of the shank 11 of the jigsaw blade 10.

The first driving element 50' and the second driving element 60' are configured to be able to clamp the first clamping plate 30' and the second clamping plate 40' together. When a jigsaw blade 10 is inserted into the clamping device 100', the shank 11 of the jigsaw blade 10 is located in the slot 41' of the second clamping plate 40', and the first clamping plate 30' and the second clamping plate 40' are fastened together by means of the first driving element 50' and the second driving element 60', so that the jigsaw blade 10 is clamped in the clamping device 100'. On the other hand, when a reciprocating saw blade 20 is inserted into the clamping device 100', the fixing pin 31' is inserted through a through hole 32' of the first clamping plate into a circular hole 22 in the shank 21 of the reciprocating saw blade 20, and the first clamping plate 30' and the second clamping plate 40' are fastened together by means of the first driving element 50' and the second driving element 60', so that the reciprocating saw blade 20 is clamped in the clamping device 100'.

A defect in such a clamping device 100' is that it is difficult for an operator to insert a corresponding saw blade to an accurate position, which may result in that the first driving element 50' and the second driving element 60' fail to drive the first clamping plate 30' and the second clamping plate 40' into correct clamping condition.

Thus, it is desirable to solve the above problem found in the prior art.

SUMMARY OF THE INVENTION

An object of the invention is to provide a saw blade clamping device for a linearly reciprocating type sawing machine, which has a simple structure and is easy to be operated.

For this end, the invention provides a saw blade clamping device for a linearly reciprocating type sawing machine, the saw blade clamping device being able to clamp at least two types of saw blades and comprising a clamping seat having a connecting portion configured to be driven by the linearly reciprocating type sawing machine and a loading portion formed by extending from the connecting portion, the loading portion being provided with a loading slot; an operating member comprising an operating portion as well as an assembling end and a loading end formed on opposite ends of the operating portion respectively, the operating portion being assembled around the loading portion of the clamping seat by the help of the assembling end, and the loading end being provided with a loading port; and an abutting element disposed between the operating member and the clamping seat, the abutting element having an abutting end which can extend into the loading slot; wherein the operating member is able to be rotated with respect to the loading portion, an inner wall of the operating member is provided with a driving surface formed in the form of a curved surface, the abutting element is provided with a driving end which abuts against the driving surface, and the abutting end of the abutting element can be driven by the driving surface during the rotation of the operating member to move in a direction of extending into the loading slot.

In the saw blade clamping device according to the invention, the operating member is provided with the driving surface, by means of which an operator can perform operation easily. Thus, the saw blade clamping device of the invention is easy to be operated.

In this way, the invention provides an advantageous option to users.

BRIEF DESCRIPTION OF THE DRAWINGS

FIGS. 4A and 4B show in a sectional view and a front view respectively the initial position of the saw blade clamping device of the invention;

FIGS. 6A and 6B show in sectional views the saw blade clamping device of the invention when a reciprocating saw blade is in a loaded state;

FIG. 6C shows in a front view the saw blade clamping device of the invention when the reciprocating saw blade is in the loaded state;

FIGS. 8A and 8B show in sectional views the saw blade clamping device of the invention when a jigsaw blade is in a loaded state;

FIG. 8C shows in a front view the saw blade clamping device of the invention when the jigsaw blade is in the loaded state.

DETAILED DESCRIPTION OF PREFERRED EMBODIMENTS

Now the principle of a saw blade clamping device according to the invention will be described with reference to the drawings.

The invention relates to a saw blade clamping device 100 which is mainly used with linearly reciprocating type sawing machines, such as jigsaws or reciprocating saws, for loading saw blades therein, so that cutting operations can be performed by using the linearly reciprocating type sawing machines.

Figure 1A:
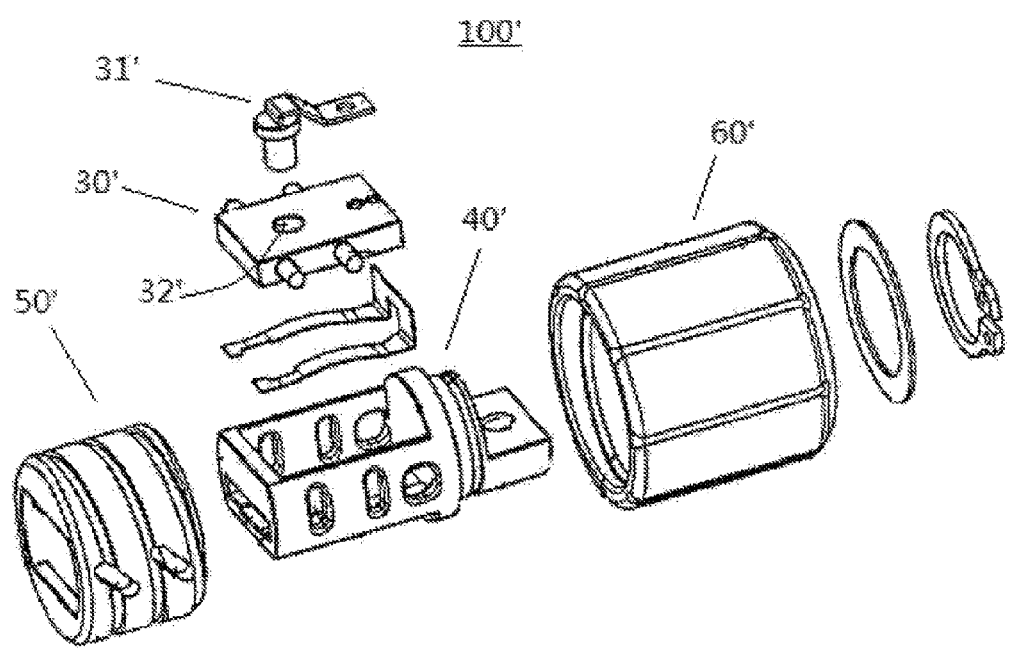
FIG. 1A is an exploded perspective view of a saw blade clamping device of the prior art.
Figures 1B, 1C:
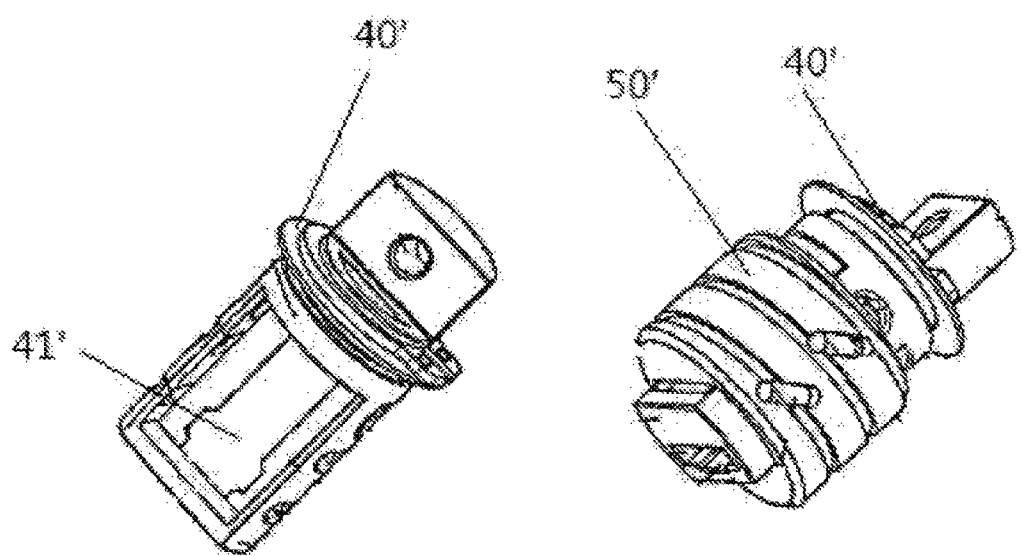
FIGS. 1B and 1C show in perspective views a component of the saw blade clamping device of the prior art.
Figure 2A:
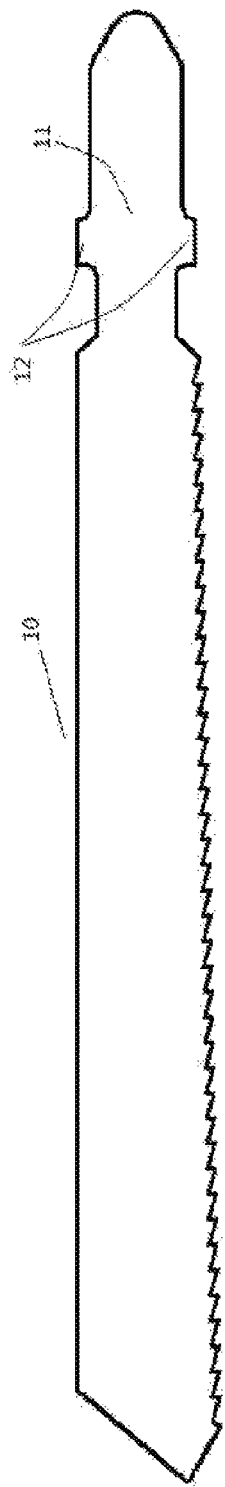
FIGS. 2A and 2B show in respective front views a jigsaw blade and a reciprocating saw blade.
Figure 2B:
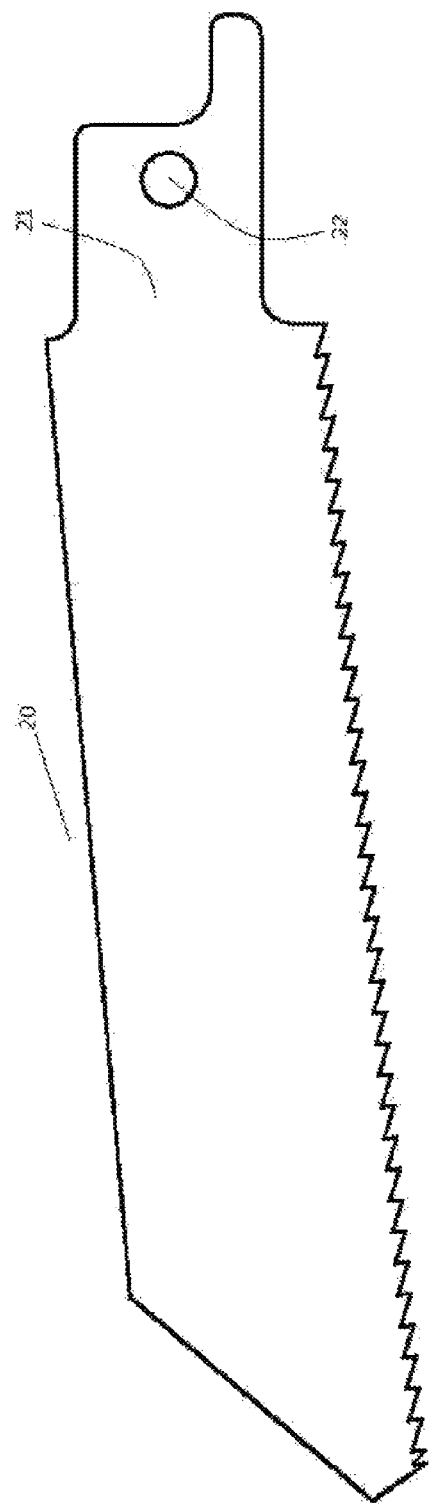

As shown in FIGS. 2A and 2B, a jigsaw blade 10 and a reciprocating saw blade 20 have shanks of different shapes, and the saw blade clamping device 100 of the invention is able to clamp the shank 11 of the jigsaw blade 10 as well as the shank 21 of the reciprocating saw blade 20.

Figure 3A:
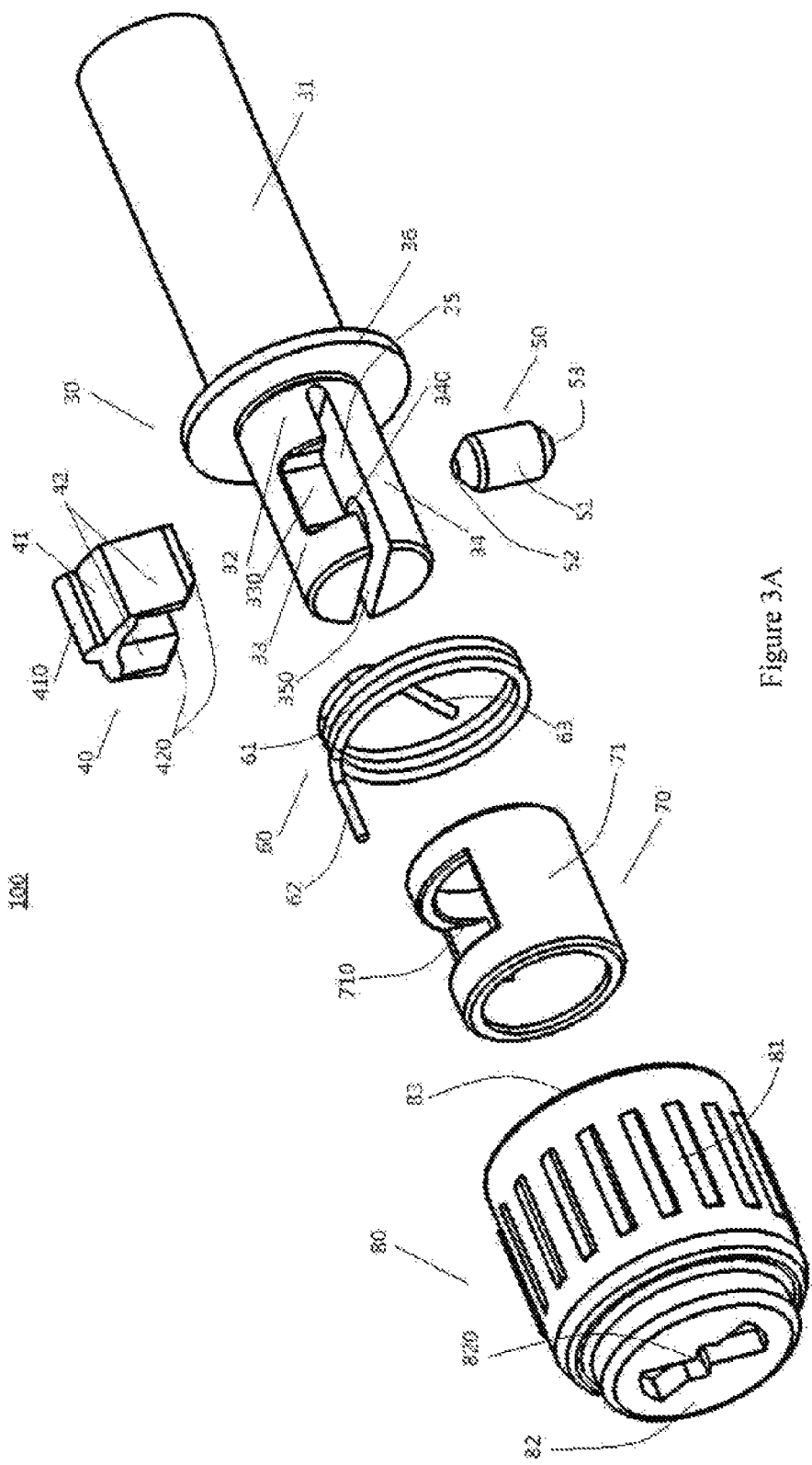
FIG. 3A is an exploded perspective view of a saw blade clamping device of the invention.
Figure 3B:
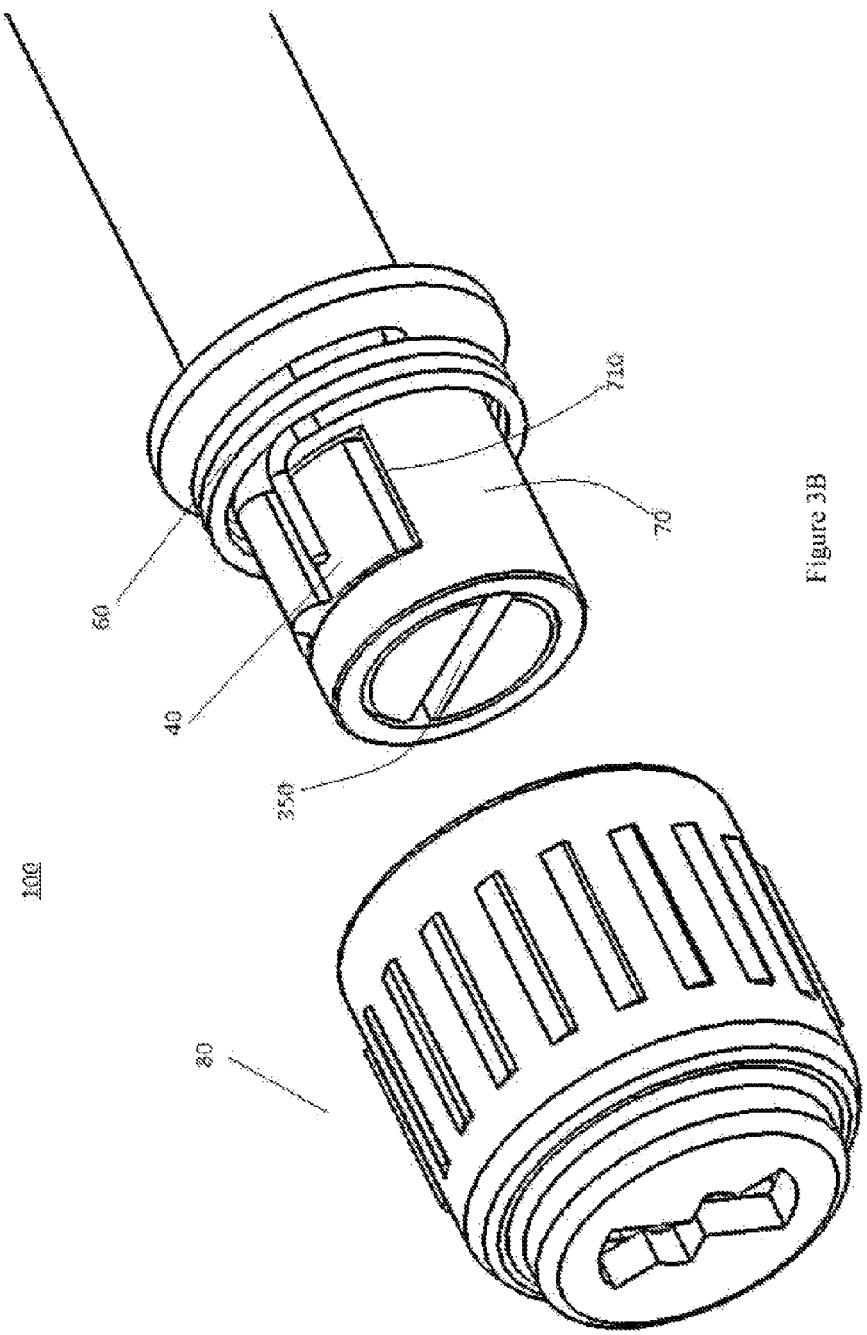
FIG. 3B is an exploded perspective view of a portion of the saw blade clamping device of the invention.

As shown in FIGS. 3A and 3B, the saw blade clamping device 100 of the invention comprises a clamping seat 30, an abutting element comprising a U-shaped member 40 and a fixing pin 50, an elastic member 60, a holding member 70, and an operating member 80.

The clamping seat 30 comprises a cylindrical connecting portion 31 which is coupled with a stroke rod of a linearly reciprocating type sawing machine, by means of which the linearly reciprocating type sawing machine drives a saw blade loaded in the clamping device 100 to move in a linearly reciprocating way, so that a cutting operation is performed. A cylindrical loading portion 32 is formed by extending from the cylindrical connecting portion 31 in the longitudinal direction thereof, a stop part 36 being formed between the connecting portion 31 and the loading portion 32. The stop part 36 is in the form of a circular ring around the cylindrical portions, having a cross sectional area which is larger than either of that of the connecting portion 31 and that of the loading portion 32. The loading portion 32 comprises a first clamping piece 33 and a second clamping piece 34, a loading slot 35 being formed between the first clamping piece 33 and the second clamping piece 34. The first clamping piece 33 and the second clamping piece 34 are each of the shape of a semi-cylinder and are opposed to each other. The loading slot 35 is defined by facing planes of the first clamping piece 33 and the second clamping piece 34, and an opening 350 of the loading slot 35 is defined between free tip ends of the first clamping piece 33 and the second clamping piece 34. A corresponding notch 330 is formed on each of opposite lateral sides of the first clamping piece 33, with both the notches 330 on the opposite sides of the first clamping piece 33 being communicated with the loading slot 35. A through hole 340 extending through the second clamping piece 34 is formed in a middle portion of the second clamping piece 34. The through hole 340 is also communicated with the loading slot 35.

The U-shaped member 40 comprises a U-shaped portion 41 and branched arms 42 extending in parallel from opposite ends of the U-shaped portion 41, wherein a protrusion 410 is formed on a middle portion of the U-shaped portion 41. The U-shaped member 40 is assembled to the first clamping piece 33, wherein the two branched arms 42 of the U-shaped member 40 are received in the opposite notches 330 of the first clamping piece 33 respectively, and tip ends 420 of the two branched arms 42 are configured as abutting ends which are able to abut against the plane of the second clamping piece 34.

The fixing pin 50 comprises a cylindrical pin body 51 and a first top end 52 and a second top end 53 forming opposite ends of the pin body 51. The first top end 52 and the second top end 53 forming the opposite ends each has a cross sectional area that is decreased gradually in a direction away from the pin body 51. The fixing pin 50 is received in the through hole 340 of the second clamping piece 34. The distance between the first top end 52 and the second top end 53 of the fixing pin 50 is larger than the sum of the depth of the loading slot 35 and the maximum thickness of the second clamping piece 34. The first top end 52 of the fixing pin 50 extends through the second clamping piece 34 and abuts against the plane of the first clamping piece 33.

The elastic member 60 is in the form of a helical spring which is able to provide a spring force in its helical direction and comprises a helical body 61, a first fixing leg 62, and a second fixing leg 63. The elastic member 60 is assembled around the loading portion 32 and abuts against the stop part 36. The second fixing leg 63 is received in the loading slot 35 within the inner most end of the loading slot 35 which is longitudinally opposite to the opening 350.

The holding member 70 is in the form of a cylindrical sleeve and comprises a sleeve body 71 which is formed with a through cut 710 and an aperture 711. The sleeve body is assembled around the loading portion 32. In the assembled state, the through cut 710 of the sleeve body 71 is aligned with the notches 330 of the first clamping piece 33, and the aperture 711 is aligned with the through hole 340 of the second clamping piece 34. The U-shaped member 40 is assembled to the first clamping piece 33 through the through cut 710 of the holding member 70, and the fixing pin 50 is received in the through hole 340 of the second clamping piece 34 through the aperture 711.

The operating member 80 is in the form of a cylindrical sleeve and comprises an operating portion 81 defined by a sleeve body, and a loading end 82 and an assembling end 83 formed on opposite ends of the operating portion 81. The assembling end 83 defines an opening, so that the operating member 80, by means of the assembling end 83, is assembled around the loading portion 32 which is already assembled with the U-shaped member 40, the fixing pin 50, the elastic member 60 and the holding member 70 as described above. The inner wall 84 (shown in FIG. 4A) of the operating member 80 is formed with a narrow slot 840 for receiving the first fixing leg 62 of the elastic member 60. Both the protrusion 410 on the U-shaped member 40 and the second top end 53 of the fixing pin abut against the inner wall 84 of the operating member 80 and are able to slide along the wall surface of the inner wall 84. The inner wall 84 is provided with a first driving surface 842 and a second driving surface 843 (shown in FIG. 4A) each formed by a curved surface, the first driving surface 842 comprising a start end 841, and the second driving surface 843 comprising a terminal end 844. The first driving surface 842 and the second driving surface 843 are formed in an opposed manner in the inner wall 84 of the operating member 80. In addition, in the direction reverse to the direction A shown in FIG. 4A, the first driving surface 842 and the second driving surface 843 are each defined by a curved trajectory surface which is formed by varying the wall thickness at the inner wall 84 of the operating member 80, wherein the start end 841 is at a location on the first driving surface 842 where the operating member presents a maximum wall thickness, and the terminal end 844 is at a location on the second driving surface 843 where the operating member presents a minimum wall thickness. The operating member 80 can be rotated when the operating portion 81 is manipulated, and after rotation, the operating member 80 can return to its original position under the spring force of the elastic member 60. The operating member 80 IS coaxial with the loading portion 32, so that the operating member returns to its original position around a central axis. The loading end 82 of the operating member 80 is provided with a loading port 820 (shown in FIG. 4B) which is composed of a first sector opening 821 and a second sector opening 822.

The first sector opening 821 is formed by two opposing sector surfaces having the same radius and extending through the same radian, while the second sector opening 822 is formed by another two opposing sector surfaces having the same radius and extending through the same radian. The first sector opening 821 and the second sector opening 822 share the same symmetric center 0, and an angle B is formed between the radial or longitudinal symmetric lines of the first sector opening 821 and the second sector opening 822. The first sector opening 821 forms an effective portion of the loading port 82 which has a width larger than that of the effective portion of the loading port 82 formed by the second sector opening 822. The first sector opening 821 and the second sector opening 822 may be formed as a narrow slot which allows the shank of a saw blade to be inserted in, or be formed as other similar structures. The width of the effective portion of the loading port is defined as the maximum allowance width of the overlap area between the first sector opening 821 or the second sector opening 822 and the opening 350 of the loading slot 35. The radian of each of the first sector opening 821 and the second sector opening 822 is larger than the depth of the opening 350 of the loading slot 35.

As shown in FIGS. 4A and 4B, the initial position of the saw blade clamping device 100 of the invention is illustrated. In this condition, the protrusion 410 of the U-shaped member 40 abuts against the start end 841 which is on the first driving surface 842, with the tip ends 420 of the branched arms 42 of the U-shaped member 40 extending into the loading slot 350 and abutting against the plane of the second clamping piece 34. Of course, There may be a gap between the tip ends 420 and the plane of the second clamping piece 34, providing that the depth of this gap is smaller than the depth of the thinnest saw blade among a group of saw blades. The first top end 52 of the fixing pin 50 extends into the loading slot 35, and the second top end 53 abuts against the portion of the second driving surface 843 where it has the most wall thickness. The second sector opening 822 overlaps the opening 350 of the loading slot 35. By means of the start end 841, it is able to prevent the operating member from rotating in the direction reverse to the direction A, and the elastic member 60 provides a pre-applied spring force to the operating member 80 in the direction reverse to the direction A, by means of which spring force, the start end 841 of the operating member 80 and the protrusion 410 abut against each other, so that the saw blade clamping device 100 of the invention is kept in its initial position shown in FIGS. 4A and 4B.

Figure 5B:
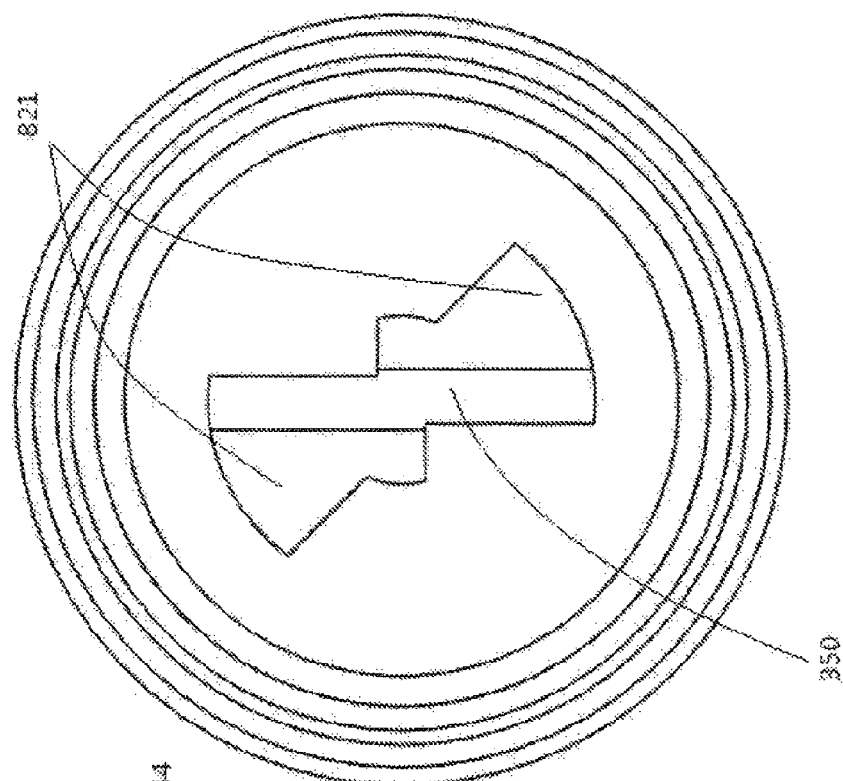
FIGS. 5A and 5B show in a sectional view and a front view respectively the loading position of the saw blade clamping device of the invention.
Figure 5A:
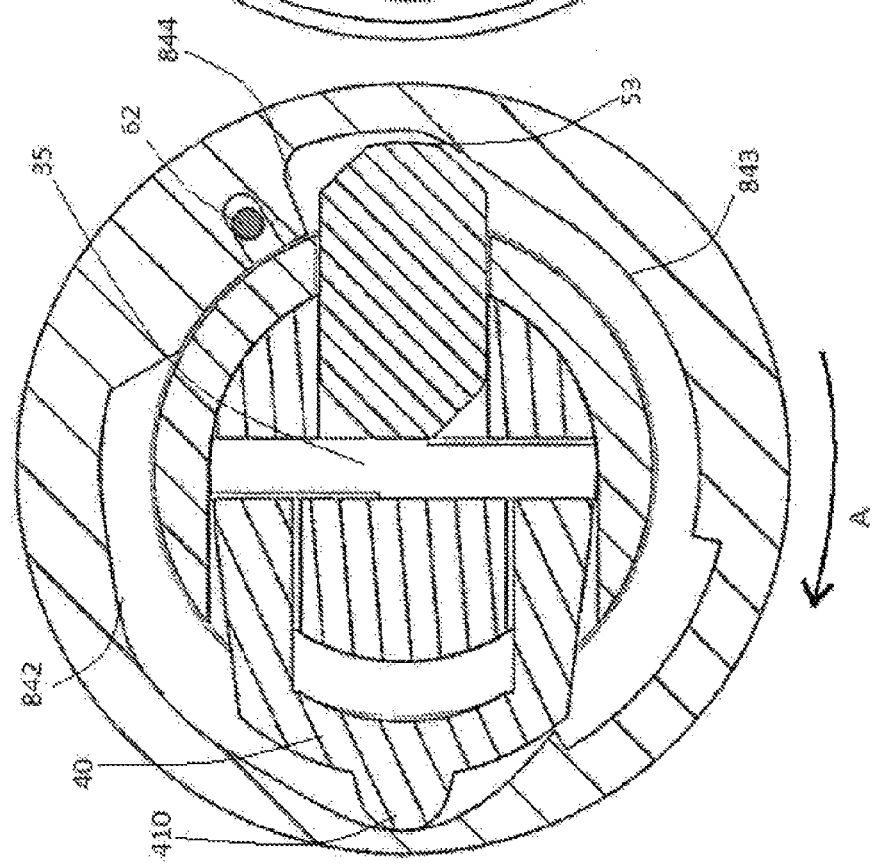

During operation, when an operator rotates the operating member 80 by the help of the operating portion 81 in the direction A, the operating member 80 is driven to rotate in the direction A with respect to the loading portion 32. In this condition, the protrusion 410 and the second top end 53 slide along the first driving surface 842 and the second driving surface 843 respectively. As mentioned above, the wall thicknesses at the first driving surface 842 and the second driving surface 843 are varied in the direction A according to the curved trajectory surface, thus, during sliding, spaces that allow the U-shaped member 40 and the fixing pin 50 to move in directions away from the first clamping piece 33 and the second clamping piece 34 respectively are provided. As shown in FIGS. 5A and 5B, a loading position of the saw blade clamping device 100 of the invention is illustrated. In this condition, the second top end 53 of the fixing pin 50 abuts against the terminal end 844, so that the operating member 80 is prevented from rotating further in the direction A. The tip ends 420 of the branched arms 42 and the first top end 52 of the fixing pin 50 are withdrawn from the loading slot 350, and the first sector opening 821 overlaps the opening 350 of the loading slot 35.

Figure 7:
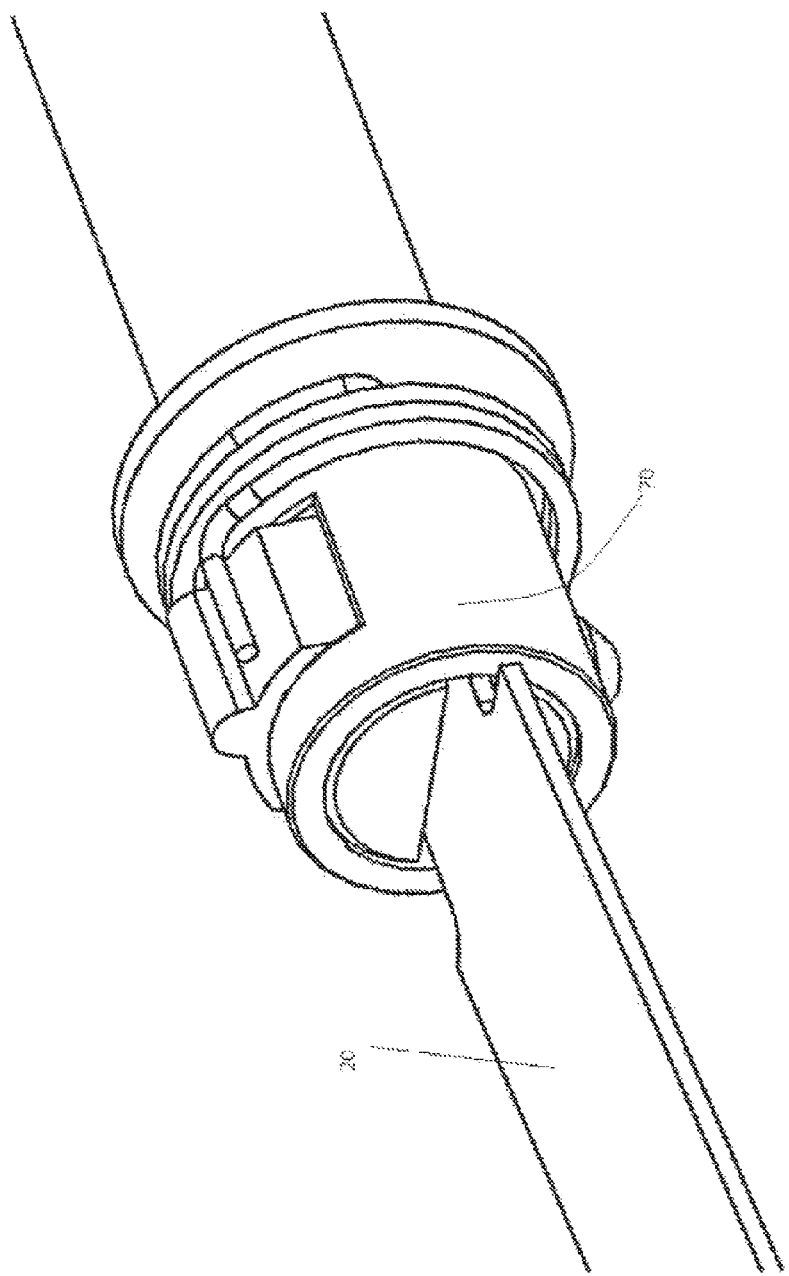
FIG. 7 is a perspective view of the saw blade clamping device of the invention when the reciprocating saw blade is in the loaded state.
Figure 9:
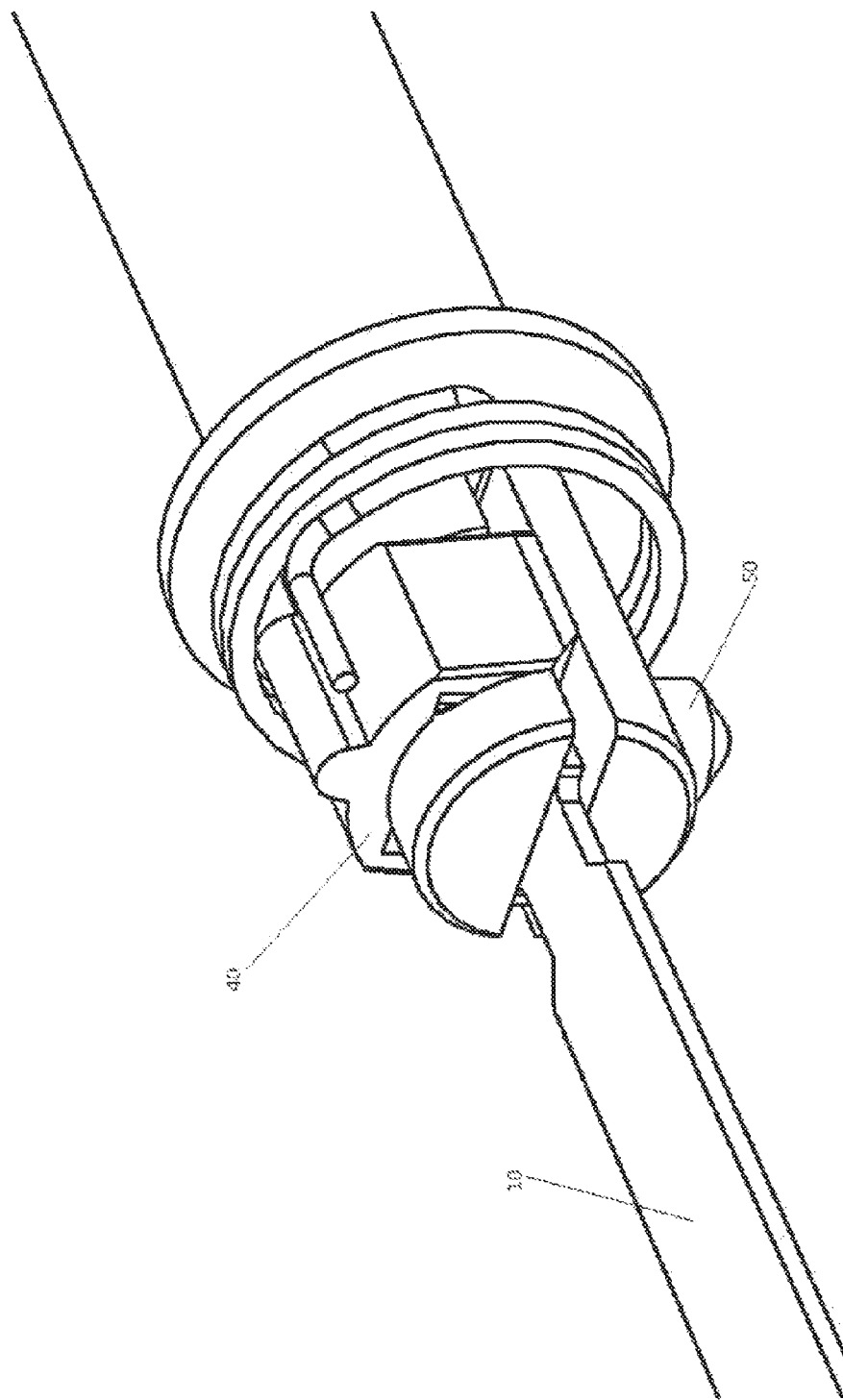
FIG. 9 is a perspective view of the saw blade clamping device of the invention when the jigsaw blade is in the loaded state.

Now a saw blade to be used can be loaded into the saw blade clamping device 100 of the invention. When a reciprocating saw blade 20 is to be loaded, the shank 21 of the reciprocating saw blade 20 is inserted into the loading port 820. Since the operating member 80 is in the loading position, the shank 21 of the reciprocating saw blade 20 is inserted into the loading slot 350 through the effective portion of the loading port where the first sector opening 821 overlaps the opening 350 of the loading slot 35. During insertion, the U-shaped member 40 and the fixing pin 50 move in directions away from the first clamping piece 33 and the second clamping piece 34 respectively. When the shank 21 of the reciprocating saw blade 20 is inserted into a proper position, the operating member 80 is released to allow it to rotate backwardly in the direction reverse to the direction A under the spring force of the elastic member 60. During the backward rotation, the first driving surface 842 and the second driving surface 843 of the operating member 80 drive the tip ends 420 of the U-shaped member 40 and the first top end 52 of the fixing pin 50 to extend into the loading slot 350 respectively. When the operating member 80 is rotated back to a clamping position, the two tip ends 420 of the U-shaped member 40 abut against opposite side edge portions of the shank 21 of the reciprocating saw blade 20 respectively, the first top end 52 of the fixing pin 50 is inserted into a circular hole 22 formed in the shank, and the shank 21 of the reciprocating saw blade 20 is in the first sector opening 821 of the loading port 820. The holding member 70 has an internal diameter which corresponds to the width of the shank 21 of the reciprocating saw blade 20, as shown in FIG. 7. When the shank 21 of the reciprocating saw blade 20 is inserted into the loading slot 35, the reciprocating saw blade 20 can be prevented, by the holding member 70, from swing in the lateral direction. The radian of the first sector opening 821 should be larger than the rotational allowance of the operating member 80, to avoid the condition that the rotation of the operating member 80 is blocked by the first sector opening 821 which may result in that the tip ends 420 and the first top end 52 cannot come into correct positions. The width of the first sector opening 821 corresponds to that of the shank 21 of the reciprocating saw blade 20, so that the stability degree of the reciprocating saw in the clamping device 100 is increased.

As shown in FIGS. 8A, 8B, 8C, and 9, when a jigsaw blade 10 is to be loaded, the shank 11 of the jigsaw blade 10 is inserted into the loading port 820. Since the operating member 80 is in the loading position, the shank 11 of the jigsaw blade 10 is inserted into the loading slot 350 through the effective portion of the loading port where the first sector opening 821 overlaps the opening 350 of the loading slot 35. During insertion, the fixing pin 50 moves in the direction away from the second clamping piece 34. When the shank 11 of the jigsaw blade 10 is inserted into a proper position, the operating member 80 is released so that it is rotated in the direction reverse to the direction A under the spring force of the elastic member 60. During the backward rotation, the first driving surface 842 and the second driving surface 843 of the operating member 80 drive the tip ends 420 of the U-shaped member 40 and the first top end 52 of the fixing pin 50 to extend into the loading slot 350 respectively. The distance between the two tip ends 420 of the U-shaped member 40 is larger than the width of the shank 11 of the jigsaw blade 10. After the operating member 80 is rotated back to the clamping position, once the two tip ends 420 of the U-shaped member 40 extend into the loading slot 35, internal side surfaces of the two tip ends 420 abut against opposite sides of the shank 11 of the jigsaw blade 10. The first top end 52 of the fixing pin 50 abuts against the shank 11 of the jigsaw blade 10 and pushes the shank 11 of the jigsaw blade 10 against the inner wall of the first clamping piece 33 tightly. The shank 11 of the jigsaw blade 10 is in the second sector opening 822 of the loading port 820. As shown in FIGS. 8A and 8B, a pair of stops 12 are formed on opposite sides of the shank 11 of the jigsaw blade 10, the width between the two stops 12 being larger than the width of the second sector opening 822. After loading, the two stops 12 interfere with the second sector opening 822, and the top end of the shank 11 of the jigsaw blade 10 abuts against the bottom of the loading slot 35, so that the jigsaw blade 10 is fixedly held in the saw blade clamping device 100. The radian of the first sector opening 821 should be smaller than the rotational allowance of the operating member 80, to avoid the condition that the shank 11 of the jigsaw blade 10 cannot interfere with the second sector opening 822 which may result in that the jigsaw blade 10 cannot be fixedly held in the clamping device 100.

When the operating member 80 is in the initial position, the elastic member 60 provides a pre-pressing force, and when the operating member 80 is in the clamping position, the elastic member 60 provides pressing forces to corresponding elements to force them to abut against the saw blade. It is conceived that the same effect can be achieved by screw fitting between the clamping seat 30 and the operating member 80. In this case, when the operating member 80 is in the initial position, the clamping seat 30 and the operating member 80 can be kept stably in this position by means of engaged screws therebetween. On the other hand, when the operating member 80 is in the clamping position, pressing forces which force corresponding elements to abut against the saw blade can be provided by fastening the engaged screws between the clamping seat 30 and the operating member 80. In this configuration, the loading port 820 of the operating member 80 may be provided by a separate member, to ensure that the screws between the operating member 80 and the clamping seat 30 can be engaged with each other in a free manner. Any other configurations can be used alternatively, only if the loading port 820 is composed of the first sector opening 821 and the second sector opening 822 and the same effects of the above embodiments can be achieved. Of course, further effects can be provided by remaining the elastic member 60 in the configuration in which screws are provided between the clamping seat 30 and the operating member 80.

While certain embodiments of the invention have been described here, they are presented by way of explanation only and are not intended to limit the scope of the invention. Various modifications, substitutions and changes can be made by those skilled in the art within the scope and spirit of the invention as defined in the attached claims and their equivalents.

The invention claimed is:

1. A saw blade clamping device for a linearly reciprocating type sawing machine being configured to clamp at least two types of saw blades, comprising:
 a clamping seat having a connecting portion configured to be driven by the linearly reciprocating type sawing machine and a loading portion formed by extending from the connecting portion, the loading portion having an outwardly facing surface and a loading slot;
 an operating member comprising an operating portion with an assembling end and a loading end formed on opposite ends of the operating portion respectively, the operating portion being assembled around the loading portion of the clamping seat with assistance from the assembling end, the loading end being configured with a loading port; and
 an abutting element disposed between the operating member and the clamping seat, the abutting element configured to contact the outwardly facing surface of the loading portion, the abutting element having an abutting end,
 wherein the operating member is configured to be rotated with respect to the loading portion, an inner wall of the operating member is configured with a driving surface formed in the form of a curved surface, the abutting element is configured with a driving end that abuts against the driving surface, and the abutting end of the abutting element is configured to be driven by the driving surface during the rotation of the operating member to move in a direction toward an inserted saw blade to abut against and fix the inserted saw blade,
 wherein the abutting element comprises a U-shaped member having a protrusion configured on a U-shaped portion and two branched arms extending from the U-shaped portion, the protrusion acting as the driving end of the abutting element, and tip ends of the branched arms acting as the abutting end of the abutting element
 wherein the loading portion is in the form of a cylinder and comprises a first clamping piece and a second clamping piece, the loading slot extending in the longitudinal direction of the loading portion between the first clamping piece and the second clamping piece,
 wherein a notch is configured on each of opposite sides of the first clamping piece, and the notches communicate with the loading slot, and
 wherein the two branched arms of the U-shaped member are received in the two notches of the first clamping piece respectively.

2. The saw blade clamping device of claim 1, wherein the driving surface on the inner wall of the operating member is configured to drive the U-shaped member to move in the direction toward the inserted saw blade.

3. The saw blade clamping device of claim 1, further comprising:
 a holding member in the form of a cylindrical sleeve assembled around the loading portion,
 wherein the holding member is formed with a through cut aligned with the notches of the first clamping piece, and
 wherein the U-shaped member is configured to be assembled to the first clamping piece through the through cut of the holding member.

4. The saw blade clamping device of claim 1, wherein the loading port is defined by two narrow slots intersecting with each other and having different lengths, the narrow slot having the smaller length being configured for fixedly holding one type of the saw blades into the loading slot.

5. The saw blade clamping device of claim 4, wherein the loading slot is configured with an opening, and the narrow slots of the loading port, which have different lengths, overlap the opening of the loading slot alternately as the operating member rotates.

6. The saw blade clamping device of claim 5, wherein each of the narrow slots is formed by a pair of opposing sectors.

7. The saw blade clamping device of claim 1, further comprising an elastic member disposed between the operating member and the loading portion, the elastic member being configured to provide a spring force in a circumferential direction between the operating member and the loading portion.

8. The saw blade clamping device of claim 1, wherein screws that are engageable with each other are configured between the operating member and the loading portion.

9. The saw blade clamping device of claim 1, wherein the operating member and the loading port are formed as separate members which are detachable from each other.

10. The saw blade clamping device of claim 1, further comprising:
- a further abutting element disposed between the operating member and the clamping seat, the further abutting element having a further abutting end, which is configured to extend into the loading slot, and a further driving end, which is configured to abut against the driving surface, and
- wherein the further abutting end of the further abutting element is configured to be driven by the driving surface during rotation of the operating member to move in a direction of extending into the loading slot to abut against and fix the inserted saw blade.

11. The saw blade clamping device of claim 10, wherein the further abutting element comprises a fixing pin having a first top end and a second top end, the second top end acting as the further driving end of the further abutting element, and the first top end acting as the further abutting end of the further abutting element.

12. The saw blade clamping device of claim 11, wherein the loading portion is in the form of a cylinder and comprises a first clamping piece and a second clamping piece, the loading slot extending in the longitudinal direction of the loading portion between the first clamping piece and the second clamping piece.

13. The saw blade clamping device of claim 12, wherein a notch is configured on each of opposite sides of the first clamping piece, and a through hole is configured in the second clamping piece, the notches and the through hole communicate with the loading slot.

14. The saw blade clamping device of claim 13, wherein the two branched arms of the abutting element are received in the two notches of the first clamping piece respectively, and the fixing pin is received in the through hole of the second clamping piece.

15. The saw blade clamping device of claim 14, wherein the driving surface on the inner wall of the operating member comprises a first portion and a second portion, the first portion configured to drive the abutting element to move in the direction toward the inserted saw blade and the second portion configured to drive the fixing pin to move in the direction of extending into the loading slot.

16. The saw blade clamping device of claim 14, further comprising:
- a holding member in the form of a cylindrical sleeve assembled around the loading portion,
- wherein the holding member is formed with a through cut and an aperture, the through cut being aligned with the notches of the first clamping piece, the aperture being aligned with the through hole of the second clamping piece, and
- wherein the U-shaped member is configured to be assembled to the first clamping piece through the through cut of the holding member, and the fixing pin is configured to be received in the through hole of the second clamping piece through the aperture.

\* \* \* \* \*